US011954976B2

(12) United States Patent
Abrahamson

(10) Patent No.: US 11,954,976 B2
(45) Date of Patent: Apr. 9, 2024

(54) WHEEL BONUS SYSTEM FOR GAMES

(71) Applicant: AGS LLC, Las Vegas, NV (US)

(72) Inventor: Jamie Abrahamson, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 21 days.

(21) Appl. No.: 17/331,619

(22) Filed: May 26, 2021

(65) Prior Publication Data

US 2021/0312761 A1 Oct. 7, 2021

Related U.S. Application Data

(63) Continuation-in-part of application No. 17/004,974, filed on Aug. 27, 2020, now Pat. No. 11,532,209, which is a continuation of application No. 15/936,400, filed on Mar. 26, 2018, now Pat. No. 10,769,892.

(60) Provisional application No. 62/539,576, filed on Aug. 1, 2017.

(51) Int. Cl.
*G07F 17/32* (2006.01)
*A63F 1/00* (2006.01)
(Continued)

(52) U.S. Cl.
CPC ............ *G07F 17/3267* (2013.01); *A63F 1/00* (2013.01); *A63F 3/00157* (2013.01); *A63F 5/02* (2013.01);
(Continued)

(58) Field of Classification Search
CPC ............. G07F 17/3213; G07F 17/3244; G07F 17/3211; G07F 17/3297; G07F 17/34; A63F 2003/00164; A63F 3/00157; A63F 5/02
See application file for complete search history.

(56) References Cited

U.S. PATENT DOCUMENTS 4,836,553 A 6/1989 Suttle et al.
4,861,041 A 8/1989 Jones et al.
(Continued)

FOREIGN PATENT DOCUMENTS

AU 708104 10/1997
AU 2002314959 12/2002

OTHER PUBLICATIONS

Australian Patent Office; Written Opinion of the ISA for International Application No. PCT/US2018/044431, dated Oct. 5, 2018, in 8 pages.

(Continued)

*Primary Examiner* — William H McCulloch, Jr.
(74) *Attorney, Agent, or Firm* — Weide & Miller, Ltd.

(57) ABSTRACT

A bonus providing element distinct from an underlying game enables bonus awards to players at two or more player positions of the underlying game based upon receipt of a predetermined triggering outcome in the underlying game by the bonus providing element providing an indication of at least three individual random indicators, such as: a) a first random indicator configured to provide an identification of a first award to be awarded to qualifying players of the players of the underlying game; b) a second random indicator configured to provide an identification of a single one of the two or more player positions; and c) a third random indicator configured to provide an identification of a second award to be awarded to the player at the single one of the two or more player positions indicated by the second random indictor.

12 Claims, 7 Drawing Sheets

(51) Int. Cl.
*A63F 3/00* (2006.01)
*A63F 5/02* (2006.01)

(52) U.S. Cl.
CPC ...... *G07F 17/3276* (2013.01); *G07F 17/3288* (2013.01); *G07F 17/3293* (2013.01); *A63F 2001/001* (2013.01); *A63F 2001/003* (2013.01); *A63F 2001/005* (2013.01); *A63F 2003/00164* (2013.01); *A63F 2003/0017* (2013.01); *G07F 17/3258* (2013.01)

(56) References Cited

U.S. PATENT DOCUMENTS

| | | | | |
|---|---|---|---|---|
| 5,292,127 | A | 3/1994 | Kelly et al. | |
| 5,318,298 | A | 6/1994 | Kelly et al. | |
| 5,393,067 | A | 2/1995 | Paulsen et al. | |
| 5,409,225 | A | 4/1995 | Kelly et al. | |
| 5,472,194 | A | 12/1995 | Breeding et al. | |
| 5,584,763 | A | 12/1996 | Kelly et al. | |
| 5,664,781 | A | 9/1997 | Feola | |
| 5,700,007 | A | 12/1997 | Kelly et al. | |
| 5,707,285 | A | 1/1998 | Place et al. | |
| 5,722,891 | A | 3/1998 | Inoue | |
| 5,743,523 | A | 4/1998 | Kelly et al. | |
| 5,743,800 | A * | 4/1998 | Huard | G07F 17/32 463/16 |
| 5,788,573 | A | 8/1998 | Baerlocher et al. | |
| 5,848,932 | A | 12/1998 | Adams | |
| 5,911,418 | A | 6/1999 | Adams | |
| 5,967,514 | A | 10/1999 | Kelly et al. | |
| 5,984,779 | A | 11/1999 | Bridgeman et al. | |
| 6,089,978 | A | 7/2000 | Adams | |
| 6,206,373 | B1 | 3/2001 | Garrod | |
| 6,244,595 | B1 | 6/2001 | Kelly et al. | |
| 6,299,532 | B1 | 10/2001 | Smith | |
| 6,299,534 | B1 | 10/2001 | Breeding et al. | |
| 6,334,814 | B1 | 1/2002 | Adams | |
| 6,446,964 | B1 | 9/2002 | Kelly et al. | |
| 6,491,296 | B2 | 12/2002 | Kelly et al. | |
| 6,533,273 | B2 | 3/2003 | Cole et al. | |
| 6,612,574 | B1 | 9/2003 | Cole et al. | |
| 6,612,575 | B1 | 9/2003 | Cole et al. | |
| 6,637,747 | B1 | 10/2003 | Garrod | |
| 6,663,488 | B1 | 12/2003 | Adams | |
| 6,676,517 | B2 | 1/2004 | Beavers | |
| 6,692,355 | B2 | 2/2004 | Baerlocher et al. | |
| 6,705,944 | B2 | 3/2004 | Luciano | |
| 6,827,646 | B2 | 12/2004 | Adams | |
| 6,929,264 | B2 | 8/2005 | Huard et al. | |
| 7,011,581 | B2 | 3/2006 | Cole et al. | |
| 7,100,916 | B2 | 9/2006 | Kelly et al. | |
| 7,235,011 | B2 | 6/2007 | Randall et al. | |
| 7,278,635 | B2 | 10/2007 | Kelly et al. | |
| 7,311,598 | B2 | 12/2007 | Kaminkow et al. | |
| 7,322,886 | B2 | 1/2008 | Manz | |
| 7,566,274 | B2 | 7/2009 | Johnson et al. | |
| 7,618,316 | B2 | 11/2009 | Cole et al. | |
| 7,651,394 | B2 | 1/2010 | Johnson | |
| 7,931,532 | B2 | 4/2011 | Johnson | |
| 7,963,847 | B2 | 6/2011 | Baerlocher | |
| 8,021,230 | B2 | 9/2011 | Baerlocher et al. | |
| 8,096,556 | B2 | 1/2012 | Chamberlain et al. | |
| 8,221,214 | B2 | 7/2012 | Nicely | |
| 8,342,941 | B2 | 1/2013 | Nicely | |
| 8,360,844 | B2 | 1/2013 | Schwartz et al. | |
| 8,460,082 | B2 | 6/2013 | Harris | |
| 8,740,692 | B2 | 6/2014 | Yoseloff et al. | |
| 8,932,125 | B1 | 1/2015 | Harris | |
| 8,956,213 | B2 | 2/2015 | Manz et al. | |
| 8,961,298 | B2 | 2/2015 | Czyzewski et al. | |
| 9,111,414 | B1 | 8/2015 | Sirois et al. | |
| 9,292,996 | B2 | 3/2016 | Davis et al. | |
| 9,401,064 | B2 | 7/2016 | Young | |
| 9,478,099 | B2 | 10/2016 | Czyzewski et al. | |
| 9,536,379 | B2 | 1/2017 | Czyzewski et al. | |
| 9,662,563 | B2 | 5/2017 | Van Asdale et al. | |
| 9,972,169 | B2 | 5/2018 | Davis | |
| 9,997,013 | B2 | 6/2018 | Litman | |
| 10,204,486 | B2 | 2/2019 | Van Asdale et al. | |
| 10,275,993 | B1 * | 4/2019 | Charlton | G07F 17/329 |
| 10,311,681 | B2 * | 6/2019 | Litman | G07F 17/3293 |
| 10,395,470 | B2 | 8/2019 | Czyzewski et al. | |
| 10,769,892 | B2 * | 9/2020 | Abrahamson | G07F 17/3288 |
| 2002/0042294 | A1 | 4/2002 | Pau et al. | |
| 2002/0195773 | A1 | 12/2002 | Dunn | |
| 2003/0100361 | A1 | 5/2003 | Sharpless et al. | |
| 2003/0153377 | A1 | 8/2003 | Lisowski, Sr. | |
| 2003/0236110 | A1 * | 12/2003 | Beaulieu | A63F 13/12 463/1 |
| 2004/0061288 | A1 | 4/2004 | Snow | |
| 2004/0090005 | A1 | 5/2004 | Snow | |
| 2005/0059471 | A1 | 3/2005 | Cannon | |
| 2005/0107148 | A1 | 5/2005 | Webb | |
| 2005/0119039 | A1 | 6/2005 | Berman et al. | |
| 2005/0119042 | A1 | 6/2005 | Chamberlain et al. | |
| 2006/0009278 | A1 | 1/2006 | Vancura | |
| 2006/0033268 | A1 | 2/2006 | Wong | |
| 2006/0082057 | A1 | 4/2006 | Luciano et al. | |
| 2007/0054723 | A1 | 3/2007 | Mattice et al. | |
| 2007/0060239 | A1 | 3/2007 | Nelson | |
| 2007/0072668 | A1 | 3/2007 | Hein et al. | |
| 2007/0117608 | A1 | 5/2007 | Roper et al. | |
| 2007/0135204 | A1 | 6/2007 | Nicely | |
| 2008/0009340 | A1 | 1/2008 | Walker | |
| 2008/0128986 | A1 | 6/2008 | Morris et al. | |
| 2008/0146309 | A1 | 6/2008 | Bennett | |
| 2009/0075715 | A1 | 3/2009 | Coleman et al. | |
| 2009/0203428 | A1 * | 8/2009 | Okada | G07F 17/3262 463/20 |
| 2009/0239650 | A1 * | 9/2009 | Alderucci | G07F 17/3227 463/25 |
| 2010/0087241 | A1 | 4/2010 | Nguyen et al. | |
| 2010/0113120 | A1 | 5/2010 | Snow | |
| 2011/0034237 | A1 | 2/2011 | Schulhof et al. | |
| 2011/0059789 | A1 | 3/2011 | Luciano | |
| 2012/0083341 | A1 | 4/2012 | George et al. | |
| 2012/0122545 | A1 | 5/2012 | Watkins et al. | |
| 2012/0142410 | A1 | 6/2012 | Olive et al. | |
| 2012/0244924 | A1 | 9/2012 | Willis | |
| 2012/0322546 | A1 | 12/2012 | Lalumiere et al. | |
| 2013/0029758 | A1 | 1/2013 | Berman et al. | |
| 2013/0143640 | A1 | 6/2013 | Young | |
| 2013/0157752 | A1 | 6/2013 | Yoseloff | |
| 2014/0113712 | A1 | 4/2014 | Van Asdale | |
| 2014/0200071 | A1 | 7/2014 | Czyzewski et al. | |
| 2014/0378205 | A1 | 12/2014 | Montenegro et al. | |
| 2015/0018083 | A1 | 1/2015 | Czyzewski et al. | |
| 2015/0170460 | A1 | 6/2015 | Marais | |
| 2015/0199871 | A1 | 7/2015 | Czyzewski et al. | |
| 2015/0258425 | A1 | 9/2015 | Fisher et al. | |
| 2015/0265913 | A1 | 9/2015 | Fisher et al. | |
| 2015/0379821 | A1 | 12/2015 | LaDuca | |
| 2016/0125689 | A1 | 5/2016 | Hoffman et al. | |
| 2016/0155296 | A1 | 6/2016 | Baron et al. | |
| 2017/0039799 | A1 | 2/2017 | Czyzewski et al. | |
| 2017/0323530 | A1 | 11/2017 | Hemberger et al. | |
| 2019/0043314 | A1 | 2/2019 | Abrahamson | |
| 2019/0347908 | A1 * | 11/2019 | Bolling, Jr. | G07F 17/34 |
| 2020/0394874 | A1 | 12/2020 | Abrahamson | |
| 2021/0312761 | A1 * | 10/2021 | Abrahamson | A63F 3/00157 |

OTHER PUBLICATIONS

Australian Patent Office; Notification of Transmittal of the ISR and Written Opinion of the ISR for International Application No. PCT/US2018/044431, dated Oct. 5, 2018, in 8 pages.

PRNewswire, "AGS Acquires Two Proven Table Game Titles and Bonus Spin™ Technology", Sep. 21, 2015, https://www.prnewswire.com/news-releases/ags-acquires-two-proven-table-game-titles-and-bonus-spin-technology-300146047.html, 3 pages.

* cited by examiner

* Circles can be color coded
* Illuminated when player participates

WHEEL BONUS SYSTEM FOR GAMES

RELATED APPLICATION DATA

This application is a continuation-in-part of U.S. application Ser. No. 17/004,974, filed Aug. 27, 2020, which is a continuation of U.S. application Ser. No. 15/936,400, filed Mar. 26, 2018, now U.S. Pat. No. 10,769,892, which claims priority to U.S. Provisional Patent Application Ser. No. 62/539,576, filed Aug. 1, 2017. The present application claims priority to each of said applications and incorporates by reference each of said applications as if set forth fully herein.

FIELD

The present disclosure relates to the field of casino table games and bonus outcomes on the casino table games when predetermined event outcomes occur in an underlying casino table game.

BACKGROUND

Many different systems and configuration have been attempted to provide bonus events in casino table gaming systems. Each of these have their benefits and detractions. For example, a single wheel with a single bonus event indicator on it, like a simple candy wheel, that can be spun after a player has a winning outcome. It is used to benefit a single pre-identified player after a winning event has occurred.

SUMMARY

Aspects of the disclosure comprise a bonus providing element (BPE) which is distinct from underlying game play, and methods and systems for triggering a BPE. In certain examples, the BPE enables individual players unique benefits to an underlying game when winning outcomes or triggering outcomes occur.

In certain examples, a bonus providing element distinct from an underlying game enables bonus awards to players at two or more player positions of the underlying game based upon receipt of a predetermined triggering outcome or event in the underlying game, by the bonus providing element providing an indication of at least three individual random indicators, such as: a) a first random indicator configured to provide an identification of a first award to be awarded to qualifying players of the players of the underlying game; b) a second random indicator configured to provide an identification of a single one of the two or more player positions; and c) a third random indicator configured to provide an identification of a second award to be awarded to the player at the single one of the two or more player positions indicated by the second random indictor.

In certain examples, the bonus providing element comprises a plurality of wheels, such as concentric wheels, wherein each wheel includes a plurality of segments or sectors.

In certain examples, the qualifying players comprise players of the underlying game that have placed a wager, such as a side wager.

In certain examples, the bonus providing element is activated when a community event trigger occurs in the underlying game.

In certain examples, the third indicator, such as a third concentric wheel, is only activated when the selected one of the player positions is a qualifying player.

In certain examples, the bonus providing element is presented as a graphical representation on a video display. The underlying game may comprise at least one of: a game presented at an electronic gaming table, an online game, a mobile game and a game presented at physical gaming table.

In certain examples, the first award is awarded to all qualifying players except the selected single one of the players that is awarded the second award.

Another example of the disclosure comprises a system and method for activating a bonus providing element, including selecting a triggering event therefor. In certain examples, the system may comprise a controller; at least one input device configured to provide an output to the controller regarding the underlying game; a memory; at least one display device; and machine-readable code stored in the memory and executable by the controller to cause the controller to: (a) select a triggering event associated with the underlying game, the triggering event selected from a set of triggering events utilizing at least one random number generated by the at least one random number generator; (b) utilize the output from the at least one input device to determine if the triggering event has occurred and, if so (c) activate the bonus providing element.

In certain examples, the triggering event may be selected from a plurality of triggering events in a manner in which the certain triggering events are more likely to be selected than others. As one example, relative to an underlying roulette game, the triggering event might comprise a single roulette wheel number, two roulette wheel numbers or three roulette wheel numbers, such as where the single roulette wheel number triggering event is selected on average 60% of the time, the two roulette wheel number triggering event is selected on average 30% of the time, and the three roulette wheel number triggering event is selected on average 10% of the time.

Further objects, features, and advantages of the present disclosure over the prior art will become apparent from the detailed description of the drawings which follows, when considered with the attached figures.

DETAILED DESCRIPTION

Figure 1:
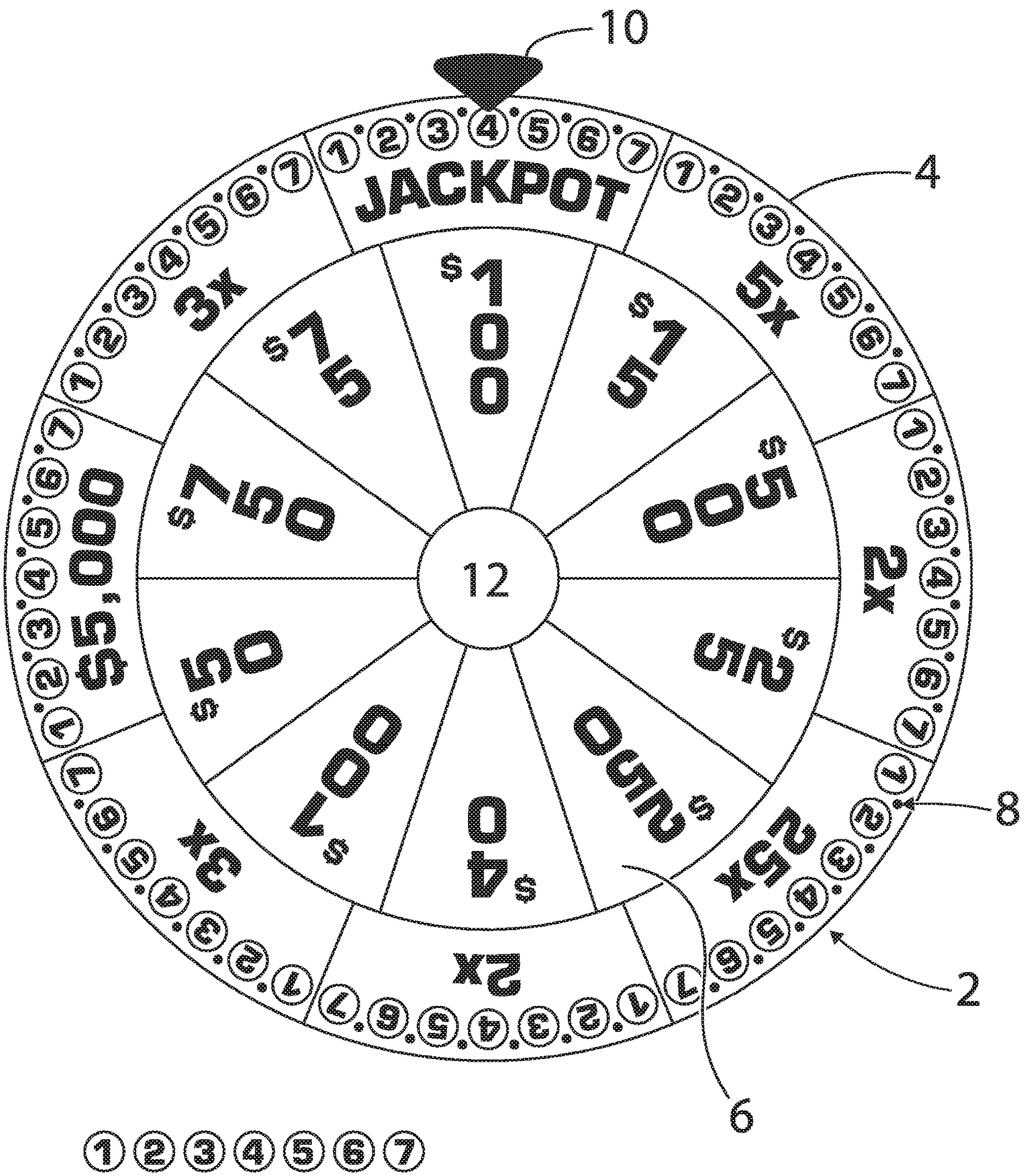
FIG. 1 shows a frontal view of a physical (or virtual) two concentric spinning wheel system.

In the following description, numerous specific details are set forth in order to provide a more thorough description of the present disclosure. It will be apparent, however, to one skilled in the art, that the present disclosure may be practiced without these specific details. In other instances, well-known features have not been described in detail so as not to obscure the disclosure.

Bonus Providing Element

One example of the disclosure is a bonus providing element (BPE) distinct from underlying game play. The BPE enables individual player unique benefits to an underlying game winning outcome. The device may be electronic (e.g., with multiple player positions around a table or arena or viewing screen) or physical and describable as including a bonus providing element distinct from underlying game play that enables individual players or groups of players unique benefits to the underlying game winning outcome or triggering outcome.

In certain examples, the bonus providing element provides a linear indication of at least three individual random indicators, wherein the at least three individual random indicators may comprise:

a) an identification of a single one of at least two different player positions;

b) at least one of an absolute amount or multiplier of a winning outcome payout; and c) at least one of a multiplier, prize or an absolute amount larger than or smaller than any absolute amount or multiplier in b).

In certain examples, when a winning outcome or triggering outcome by a first player position (any player position in a group of players) occurs in an underlying game, the bonus providing element is subsequently activated to randomly provide random outcomes for each of the at least three individual random indicators, and the random outcomes for the three individual random indicators is applied as i) one random outcome for the first player position, and ii) a combination of two remaining random outcomes indicates an award to at least one player position different from the first player position.

In the bonus providing element, linear indication may be provided by at least three distinct and randomly rotating concentric elements with a first rotating concentric element defining a sector of a first concentric circular wheel indicating one of a), b) and c), and a second rotating concentric element defining a sector of a second rotating concentric wheel one of a), b) and c) without repeating any one of a), b) and c), and a third rotating concentric element defining a sector of a third rotating concentric wheel one of a), b) and c) without repeating any one of a), b) and c).

The bonus providing element may have linear indication provided by at least two distinct and randomly rotating concentric elements with an inner element defining a sector of a circular wheel indicating one or two of a), b) and c), and at least one outer element defining a truncated sector at least one of a), b) and c) without repeating any one of a), b) and c) defined by inner element, with a total of exactly three of a), b) and c) provided by the inner element and the at least one outer element.

The bonus providing element may have linear indication provided by three distinct and randomly rotating concentric elements with an inner element defining a sector of a circular wheel indicating one of a), b) and c), and a first outer element defining a truncated sector with one of a), b) and c) without repeating any of a), b) and c) defined by the inner element; and a second outer element defining a truncated sector with one of a), b) and c) without repeating any of a), b) and c) defined by the inner element and the first outer element with a total of exactly three of a), b) and c) provided by the inner element, the first outer element and the second outer element.

The bonus providing elements may have the inner element provide exactly one of a), b) and c), and the outer element provide remaining ones of a), b) and c) not provided for in the inner element, or the outer element provide exactly one of a), b) and c), and the inner element provide remaining ones of a), b) and c) not provided for in the inner element.

The bonus providing element may have the bonus providing element providing a linear indication of at least three individual random indicators comprising three rows of at least six columns, all random outcomes for a), b) and c) distributed with all combinations of one of a), b) and c) distributed within respective ones of a top row, middle row and bottom row, and the linear indication comprising a single column.

The bonus providing element may alternatively have the bonus providing element is providing a linear indication of at least three individual random indicators comprising six rows of at least three columns, all random outcomes for a), b) and c) distributed with all combinations of one of a), b) and c) distributed within respective ones of a left column, middle column and right column, and the linear indication comprising a single row.

The bonus providing elements may be provided by physical elements including a rotating inner sector and rotating outer truncated sectors, or by virtual elements comprising a rotating inner sector and rotating outer truncated sectors provided on a video display in communication with a processor, memory and a random number generator, the random number generator providing random ones of a), b) and c) for display on the video display.

The bonus providing element in a virtual display may have random outcomes provided by virtually horizontally shifting columns on the video display or provided by virtually vertically shifting columns on the video display.

The bonus providing elements may be associated with a single a casino table configured for use with a physical playing card game, dice game, or wheel game (e.g., roulette or Big Six), multiple linked tables, an arena set up of multiple player positions, a multiplayer platform with individual players sharing a common screen or dealer and the like. The bonus providing element may be associated with a single casino table configured for use with a physical playing card game, dice game, or wheel game. The virtual or physical playing card game, dice game, or wheel game may be selected from the group consisting of blackjack, baccarat, poker, craps, sic bo, and roulette.

The wheel system is a progressive/side bet bonus system for table games. In certain examples, all players must place a separate wager before the table game begins is to participate. As described in more detail below, the bonus providing element may be activated by one or more triggers, such as a specific event that occurs during the underlying game (such as a community event, including Boxcars in craps, a 0 or 00 in roulette, trips in Sic Bo, a dealer 3 card seven in Baccarat). The wheel system contains 3 randomly generated events. In one version, the first event is a community prize that all participating players win. The second event is a player position at the table. The third event is an enhanced prize (either a multiplier of the community prize, a fixed dollar amount, a physical prize (car), or a progressive jackpot) which the player position selected in the second event wins. The selected player position must be participating in the bonus wager to receive the prize. The system may reveal the three randomly generated events in any order. In another example, the trigger is an event unique to at least one participating player (e.g. A dealt blackjack in Blackjack, a flush in Pai Gow). The wheel system contains 3 randomly generated events. The first event is a prize that the at least one participating player with the triggered event wins. The second event is a player position at the table. The third event is an Envy prize which the player position selected in the second event wins (the third event may be a percentage of the prize selected in the first event, or an absolute amount). The selected player position must be participating in the bonus wager to receive the prize. The system may reveal the three randomly generated events in any order.

The Wheel Bonus System is for all formats and all table games—Live, ETG, Virtual, Online, Mobile.

A common problem with community games is that all combinations of cards, dice and roulette results that trigger a progressive jackpot do so for all of the participating players, and the players have to share the progressive.

A method for providing bonus events to an underlying gaming event including multiple players at identified player positions may be performed by:

1) at least one player placing a wager in the underlying gaming event;
2) executing an event to conclusion of an outcome of the underlying gaming event; identifying the outcome as a predefined triggering outcome;
3) after identifying the outcome as the predefined triggering outcome, activating a bonus providing element distinct from underlying game play to enable individual players or groups of players unique benefits in the underlying game triggering outcome, the bonus providing element providing a linear indication of at least three individual random indicators, the three individual random indicators including:

a) an identification of a single one of at least two different player positions;
b) outcomes of at least one of an absolute amount or multiplier of a winning outcome payout; and
c) outcomes of at least one of a multiplier, prize or an absolute amount larger than or smaller than any absolute amount or multiplier in b); wherein, in combination with the triggering outcome by a first player position in the underlying game, the bonus providing element randomly provides random outcomes for each of the three individual random indicators, and the random outcomes for the three individual random indicators is applied as i) one random outcome for at least the first player position, and ii) a combination of two remaining random outcomes indicates an award to at least one player position that may be different from the first player position.

The method may have the bonus events available to only players wagering a predetermined minimum amount on the underlying game or available to only players wagering a side bet or progressive wager.

In certain examples of the method, a single one of at least five different player positions may be awarded only one of a), b) or c), and at least one of at least four remaining player positions in the underlying game are awarded a fixed award different from the only one of a), b) and c) awarded to the single one of the at least five player positions.

The underlying game may be a playing wagering event executed on a physical gaming table, and the bonus providing event comprises a separate physical random 25 event generator or electronic random generator comprising the three individual random indicators. The method may be executed wherein b) and c) are each unequally weighted among frequencies of b) and c) outcomes and a) is equally weighted among individual different player position frequencies.

The three randomly generated events can be displayed in several different formats.

Figure 2:
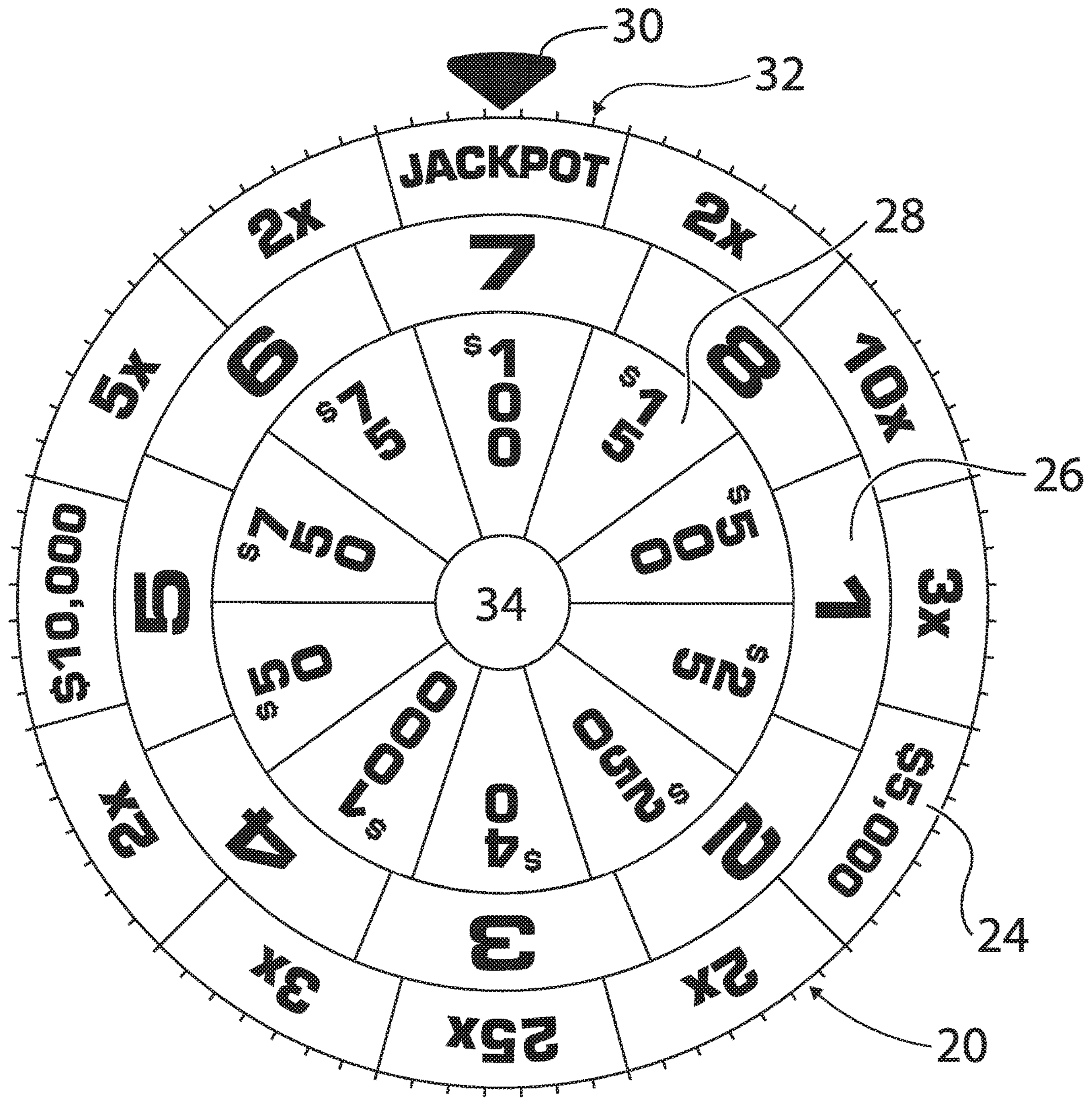
FIG. 2 shows a frontal view of a first physical (or virtual) three concentric spinning wheel system.
Figure 3:
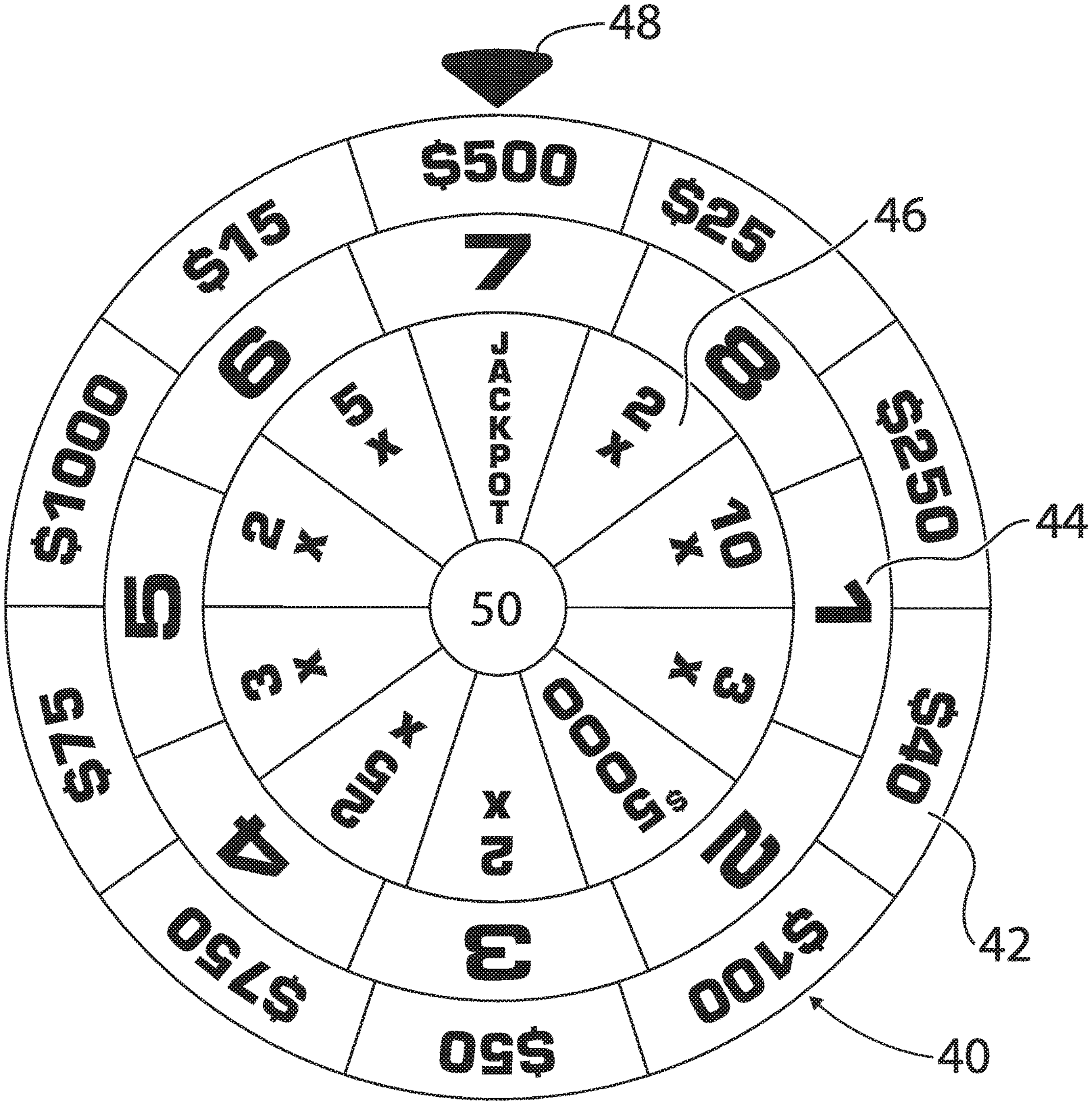
FIG. 3 shows a frontal view of a second physical (or virtual) three concentric spinning wheel system.

One example uses a wheel with three rings (FIGS. 2 and 3). One ring of the wheel determines the community prize won or an individual player position won. A 2nd ring determines a player position. This 2nd ring can have a number of sections which equals the number of player positions at the table OR can have a number of sections which equals the number of participating players at the table.

A 3rd ring determines what the enhanced prize is (either a multiplier of the community prize, a fixed dollar amount, a physical prize (car), or a progressive jackpot). The wheel may display the three rings in any order (SEE FIG. 3).

Another example uses a wheel with two rings. One ring of the wheel determines the community prize won. The second ring determines a player position AND an enhanced prize (either a multiplier of the community prize, a fixed dollar amount, a physical prize (car), or a progressive jackpot). This second ring can be displayed in two ways. The second ring can have a number of sections which display the enhanced prizes. Each of these sections can be divided into different sectors to determine which player position wins the enhanced prize (FIG. 1). The size of the sections can be proportionate to the likelihood of winning the enhanced prize (Example . . . a sector for a 2× multiplier can be larger than the jackpot sector, indicating it is more likely under the secondary RNG). However the section sizes can also be the same size, with some sections being more likely than others. In another example the second ring can have a number of sections which display the player positions. Each of these sections can be divided into different sectors to determine the enhanced prize.

Another example uses 3 individual wheels—each wheel displaying one of the three randomly generated events.

FIG. 1 shows a frontal view of a physical (or virtual) two concentric spinning wheel system 2. The system 2 is shown with an outer truncated sector 4 having both divider pegs 8 which separate each of the numbers player position identifiers (here, 1, 2, 3, 4, 5, 6, and 7 players are identified). Here a physical (or virtual) pointer identifies a random selection of Player 4 on the outer wheel 4 and the absolute value award of $100.00 in the center sector of inner wheel 6. There is a virtual or physical center axis 12 shown, with the regions 4 and 6 revolving around that center axis 12.

FIG. 2 shows a frontal view of a first physical (or virtual) three concentric spinning wheel system 20. An outermost first truncated sector wheel 24 is shown is (this is "truncated" as the innermost portion of the sector is cut away or covered by inner wheel elements 26 and 28) with multipliers and absolute award amounts (including a "Jackpot") that are higher than any absolute award amounts in the inner sector element 28, which is in turn within the second truncated sector area 26 which randomly identifies player positions (here randomly selected from among 1, 2, 3, 4, 5, 6, 7 and 8 player positions). A virtual or physical pointer 30 stops relative to virtual or physical pegs 32 to identify the three linear random bonus selector outcomes in the three areas 24, 26 and 28). The three linear random bonus selector outcomes in the three areas 24, 26 and 28 are concentric to a physical or virtual center axis 34.

FIG. 3 shows a frontal view of a second physical (or virtual) three concentric spinning wheel system 40. Again, a virtual or physical pointer 48 and center axis 50 are shown. The three areas of outer truncated sector 42, inner truncated sector 44 and inner sector 46 are shown indicating their respective individual ones of the three random elements that combine to implement the bonus. For example, when there is a suited blackjack, two naturals in baccarat, or at least a flush in a stud poker table game, the spinning wheel system 40 may be activated, and the award given (for example) whether or not the identified player position is the position triggering the event (all positions in baccarat trigger the event as there is a common players' hand) to that identified player position.

Figure 4:
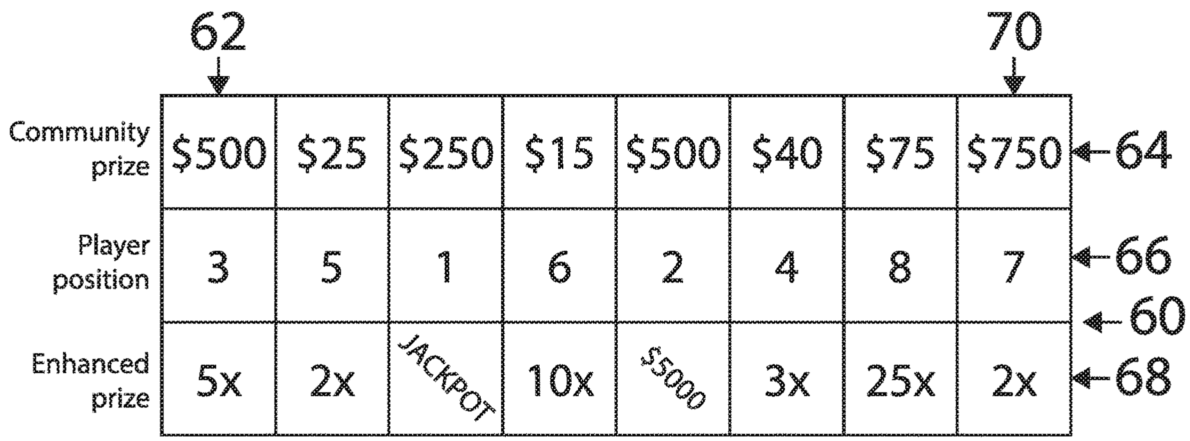
FIG. 4 shows a frontal view of a first physical (or virtual) three row, six column random event outcome system.

FIG. 4 shows a frontal view of a first physical (or virtual) three row 64, 66, 68, six column 70 random event outcome system 60. A virtual or physical pointer 62 identifies the three random indicators to be combined. The rows 64, 66, 68 would shift back and forth to create randomness, either physically or virtually.

Figure 5:
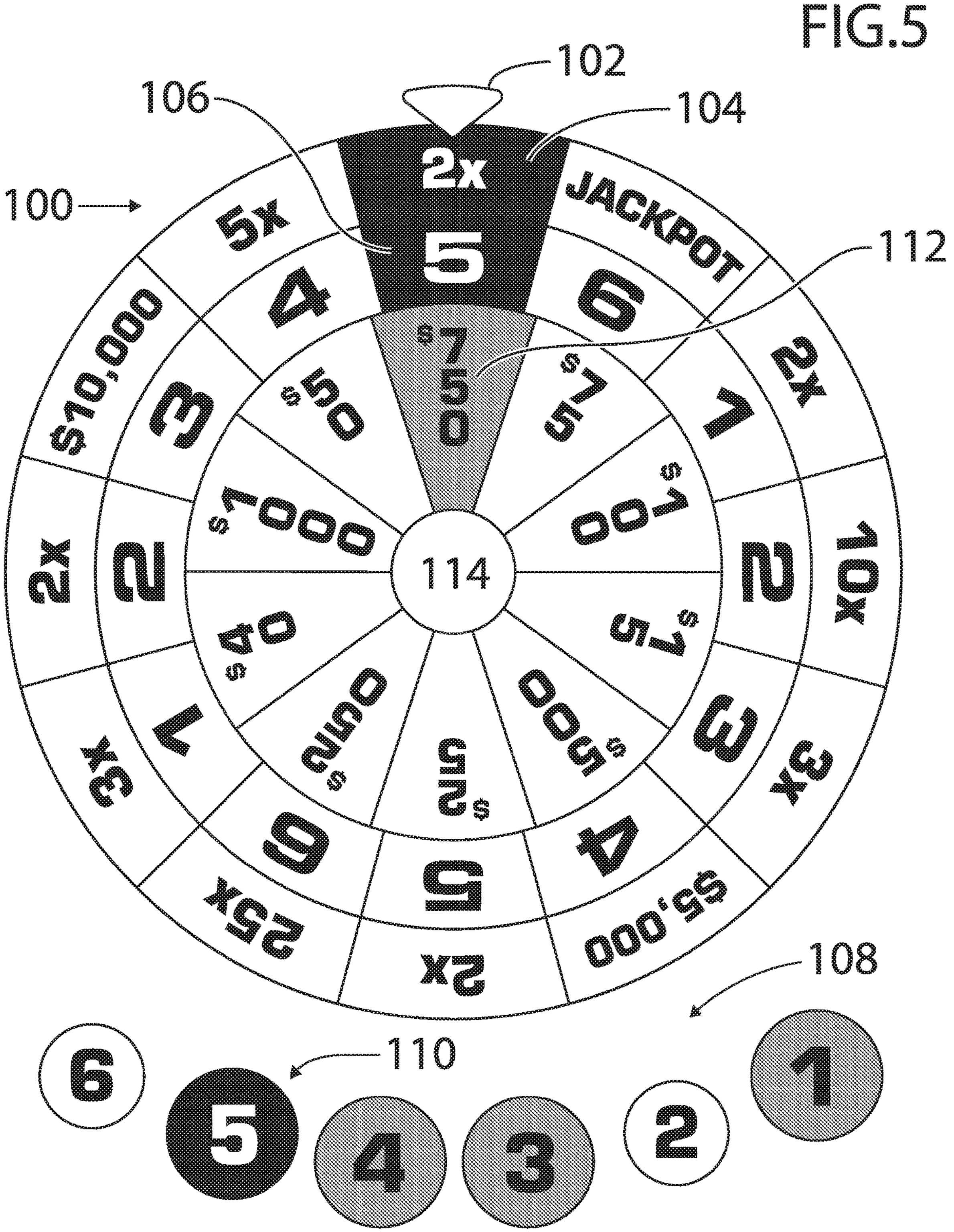
FIG. 5 shows a frontal view of a first physical (or virtual) three concentric wheel, six player column random event outcome system.

FIG. 5 shows a frontal view of a first physical (or virtual) three concentric wheel device 100, six player column random event outcome system. A pointer 102 is shown conveniently located at a top position with respect to the wheel device 100. The pointer 102 is pointing down three aligned segments 104 (showing a 2× award), a second segment 106 indicating a player position (from among 1, 2, 3, 4, 5, and 6 shown on the concentric wheel device 100) that is awarded the 2× random award of the first segment 104. The third center segment 112 (the order of the random effects is optional) indicates an award of $750 for all participating players that had the winning outcome or the triggering event for the bonus activity provided by the three concentric wheel device 100. A central spindle area 114 is shown, as well as a separate display area 108 in which the player position (110 No. 5) selected by the second segment 106 is highlighted.

Figure 6:
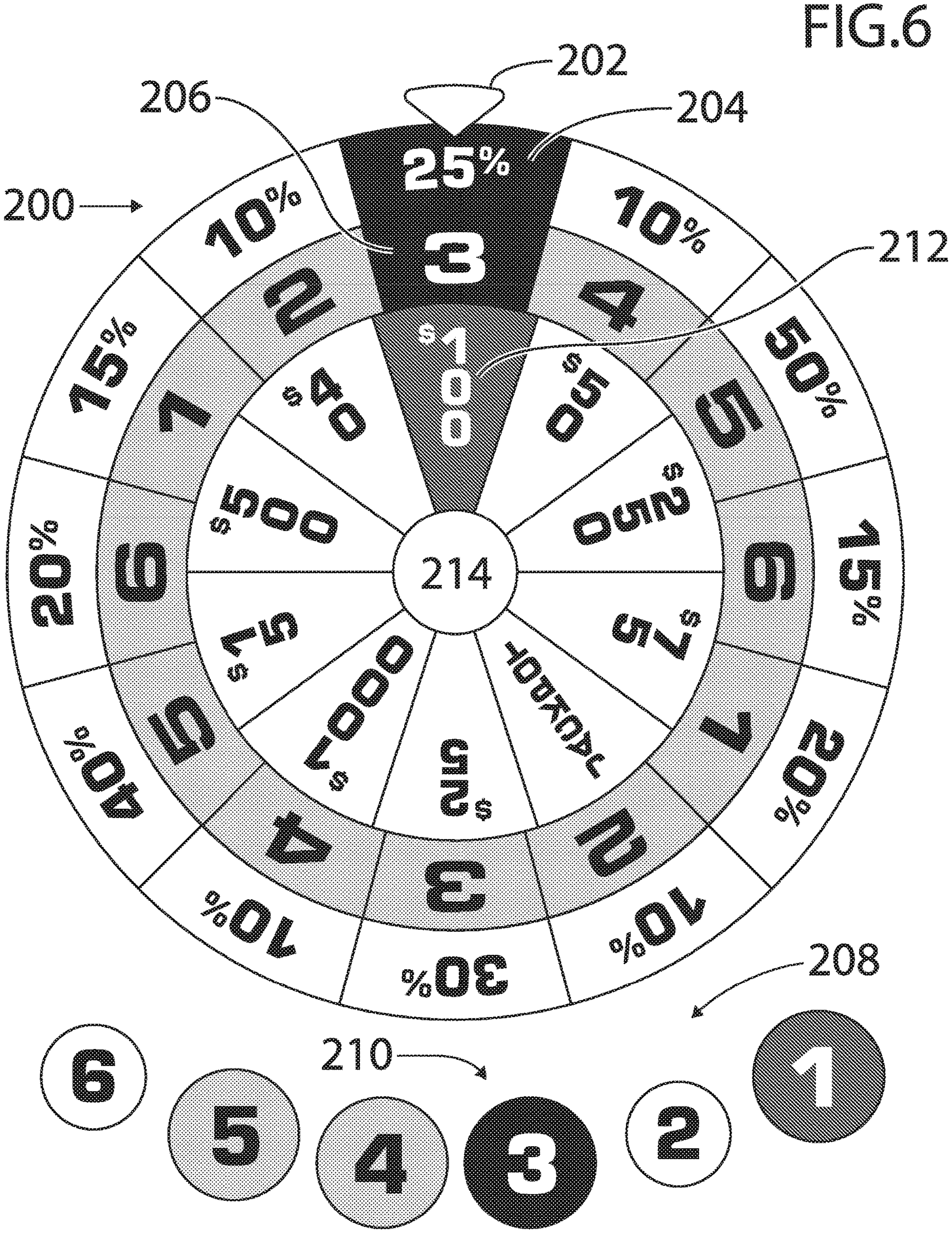
FIG. 6 shows a frontal view of a second physical (or virtual) three concentric wheel, six player column random event outcome system.

FIG. 6 shows a frontal view of a second physical (or virtual) three concentric wheel 200, six player column random event outcome system. A pointer 202 is shown conveniently located at a top position with respect to the wheel device 200. The pointer 202 is pointing down three aligned segments 204 (showing a 25% award multiplied against any objective, such as the minimum wager, the amount won by a player triggering the bonus event, or a multiple of the minimum wager, etc.), a second segment 206 indicating a player position (from among 1, 2, 3, 4, 5, and 6 shown on the concentric wheel device 200) that is awarded the 25% random award of the first segment 204. The third center segment 212 (the order of the random effects is optional) indicates an award of $100 for a player that had the winning outcome or the triggering event for the bonus activity provided by the three concentric wheel device 200. A central spindle area 214 is shown, as well as a separate display area 208 in which the player position (210 No. 3) selected by the second segment 206 is highlighted.

Event Triggering and BPE Activation

As indicated above, In certain examples, a bonus providing element (BPE) is activated at certain times. The activation of the BPE may occur when a predetermined triggering event occurs. The triggering event may comprise, for example, a particular event associated with the play of the underlying game.

One aspect of the disclosure is a method and system for activating a BPE, such as (but not limited to) the BPE described and illustrated herein, including selecting triggering events therefor.

Figure 7:
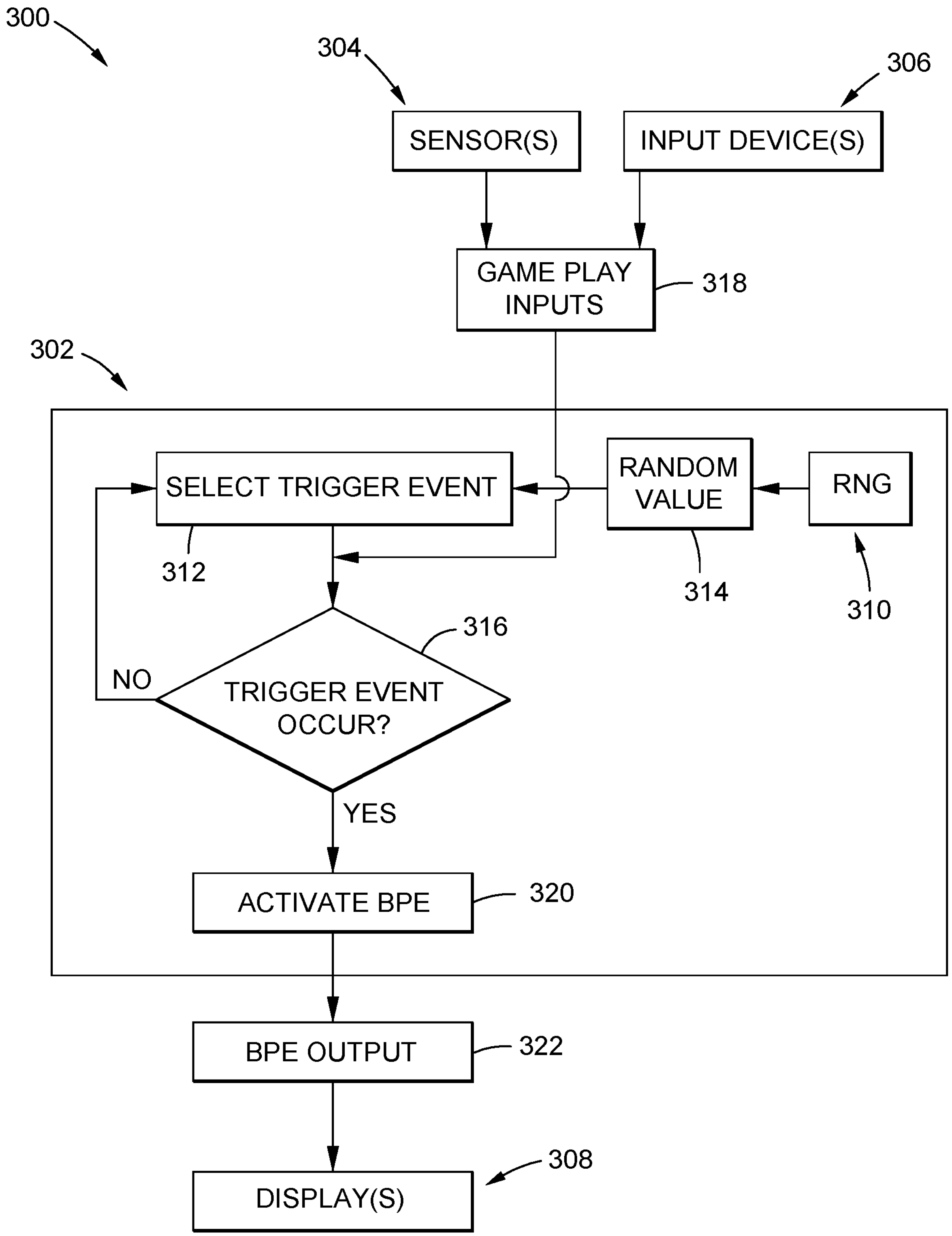
FIG. 7 schematically illustrates aspects of a system in accordance with an example of the disclosure.

FIG. 7 illustrates a system 300 for implementing a BPE, including activating the BPE. As illustrated, the system 300 comprises a controller 302. The controller 302 may comprise, for example, a processor which is configured to execute machine-readable code (e.g. "software"), which code may be stored in a memory (not shown) which is associated with the processor. The controller 302 might comprise, for example, a table controller which is located at or associated with a gaming table at which a wagering game is being presented, or might comprise a controller associated with a gaming system server or the like.

The controller 302 is preferably in communication with one or more input devices. Such input devices might comprise sensors 304 and/or other input devices 306. The sensors 304 might comprise, for example, one or more cameras, IR sensors, RFID readers or various other sensors, such as associated with a gaming table or elements thereof (such as a card shuffler, card shoe, roulette wheel, etc.). The input devices 306 might comprise devices which are configured to receive input from a user, such as a button, touch-screen, mouse, keyboard, etc., or might comprise a device which generates an output, such as a card shuffler, card shoe, etc.

The controller 302 is preferably in communication with one or more displays 308. The display(s) 308 may comprise, for example, a video display. The display 308 might also comprise a physical wheel or reel or other device.

In certain examples, the controller 302 implements, such as via the machine-readable code, a random number generator (RNG), such as which generates random numbers or values, or other types of random selectors.

Additional details of the system 300 will be appreciated from a description of a method of use thereof.

In certain examples, at one or more times, the controller 302 is configured to select one or more triggering events 312. The one or more triggering events may be selected using a random value (such as at least one random number) 314 which is generated by the RNG 310. As one example, a look-up table of triggering events may be provided, wherein the random value 314 is used to select one of the events from the table. In certain examples, the event table may include a plurality of triggering events, such as identified by a position or other identifier, and the random value may be correlated to one of the positions or identifiers, thus result in the selection of the triggering event associated with that position or other identifier.

As described below, the triggering event is preferably selected from a set of triggering events (e.g. at least two events). In certain examples, the probability of selecting at least one triggering event may be different than the probability of selecting another triggering event (so that the frequencies of certain triggering events being selected may vary from one another). Further, the triggering event may have more than one component, such as a first component which identifies a first aspect of the triggering event (such as a number of roulette wheel numbers than will comprise triggers) and a second component which identifies a second aspect of the triggering event (such as the individual roulette wheel numbers that comprise each of the triggers).

The controller 302 then determines if a triggering event has occurred 316. This determination is made by comparing game play input information 318 to the one or more selected trigger events. The game play inputs 318 may depend upon the particular game and might comprise, for example, one or more cards, one or more hands, an outcome of a roulette wheel spin or other event associated with the play of the underlying game. As indicated, such information may be provided by the one or more input device, such as the sensors 304 or other input devices 306.

As one example, a triggering event might comprise the outcome of a roulette wheel spin as the roulette wheel number "Red 23." The outcome of the roulette wheel spin may be provided to the controller 302 via a sensor, such as a sensor associated with the roulette wheel, or might be provided by the croupier (such as by input to a touch-screen display), for comparison to the triggering event.

If the triggering event does not occur, then the BPE is not activated (e.g. in the above example, such as if the outcome of the roulette wheel spin was the selection of a roulette wheel number other than Red 23). However, if the selected triggering event did occur, then the controller 302 may be configured to activate the BPE. This may comprise the controller 302 generating an output 322, such as information to be displayed by the one or more displays 308, an output signal which causes a physical wheel to be rotated (such as with a motor, etc.). Of course, the controller 302 might activate the BPE in conjunction with other inputs or signals. For example, In certain examples, a player or dealer might be permitted to provide an input which implements the BPE. As one example, the controller 302 might activate the BPE and then display a "touch to spin" button on the display 308. A player or the dealer might then provide a spin input, such as via a spin button. Upon receiving that input, the controller 302 might generate the BPE output or send that output to the display(s) 308 so as to cause them to display the BPE event.

One example of the disclosure comprises a method and system for activating a BPE associated with a roulette game. In certain examples of the disclosure, the triggering event for a particular roulette game may comprise different numbers of triggers, such as one (1) roulette number, two (2) roulette numbers, or three (3) roulette numbers. Most preferably, the frequencies of those triggering events differs, such as by having the 1-number trigger be selected more frequently than the 2-number trigger, which is selected more frequently than the 3-number trigger. As one example, the 1-number trigger might be configured to be selected approximately or on average 60% of the time, the 2-number trigger 30% of the time, and the 3-number trigger 10% of the time (e.g. whereby one or more of the triggering events has a higher probability of being selected than one or more other triggering events). This could be implemented in various manners, such as by a look-up table with slots 1-10, where the 1-number trigger is associated with positions 1-6, the 2-number trigger with slots 7-9, and the 3-number trigger with slot 10, such as shown in Table 1 below:

TABLE 1

| Position | Triggers |
|---|---|
| 1 | 1 number |
| 2 | 1 number |
| 3 | 1 number |
| 4 | 1 number |
| 5 | 1 number |
| 6 | 1 number |
| 7 | 2 numbers |
| 8 | 2 numbers |
| 9 | 2 numbers |
| 10 | 3 numbers |

The RNG output may then be compared to the table. For example, the RNG output might comprise the numbers 1-10, such that the random selection of the number "6" would result in the selection of position 7 in the table, and thus a 2-number triggering event. Given that two times as many "1-number triggers" are associated with the table than "2-number triggers", it would be expected that a 1-number trigger would be selected approximately twice as often as a 2-number trigger.

Once the type of triggering event (in this case the number of triggers) has been selected in this manner, the one or more individual roulette numbers which comprise the triggers might then be separately selected (in other examples, the particular roulette wheel numbers for each might be fixed), such as again via the RNG, such as by using one or more additional or second random numbers. As one example, assuming that the roulette wheel being used is a "00" wheel, a table might be provided with spaces 1-38, wherein positions 1-36 correspond to the numbers 1-36, position 37 corresponds to the number 0 and position 38 corresponds to the number 00, such as illustrated in Table 2 below:

TABLE 2

| Position | Roulette Wheel Number |
|---|---|
| 1 | 1 |
| 2 | 2 |
| Etc. | Etc. |
| 36 | 36 |
| 37 | 0 |
| 38 | 00 |

If the RNG outcome was 38, then the roulette wheel number selected would be 00. In this configuration, a first output of the RNG may be used to select the required number of roulette wheel numbers or positions (e.g. the number of triggers) and additional RNG outputs may be used to select the individual triggers, e.g. the specific roulette wheel number or numbers For example, if a 1-number trigger was selected, then one roulette wheel number is selected using the RNG, such as 00. If a 2-number trigger had been selected, then two roulette wheel numbers are selected using the RNG, such as the numbers 00 and 6.

Of course, the controller 302 may be configured to generate or select the triggering events in other manners. For example, a complex look-up table might be generated which has positions corresponding to 1, 2 and 3 number triggering events, wherein each position also designates the particular roulette wheel numbers (e.g., Position 1: 4; Position 2: 23,35; Position 3: 10, 17 and 31), where the number of positions that correspond to each type of triggering event might vary (for example, 60% of the positions may be 1-number positions, etc.).

In certain examples, once the roulette game triggering event has been selected by the controller 302, it may be displayed or otherwise indicated to the players and dealer, such as via display on the display 308. In certain examples, a roulette game triggering event it selected for each roulette game (whereby the triggering event for each game is variable).

Another example of the disclosure comprises a method and system for activating a BPE associated with a craps game. In certain examples, the selection of the triggering event may comprise the selection the combined point total of the roll of two dice (e.g. a dice roll count), such as any number between 2 and 12. In certain examples, however, the triggering event comprises only a sub-set of those numbers which comprise craps "points" or point values, e.g. dice roll count totals of 4/5/6 and 8/9/10. In certain examples, the triggering event comprises a single one of these points, but might comprise more than one (in similar manner to the roulette triggering event described above, such as any 1 point, any 2 of the points, etc.). Further, in certain examples, the frequency of the selection of each point may be the same, but in other examples, it might vary.

In certain examples, the triggering event for a craps game may be selected at various times, such as before the come out roll for the game. Once again, the triggering event for the craps game may be indicated, such as by the display, to the players.

Of course, the principles of the disclosure may be applied to other underlying games.

It will be appreciated that aspects of the disclosure may be used in combination or apart from one another. For example, the BPE described above might be implemented relative to a different method and system for activating the BPE than just described. Further, the method and system for activating a BPE might be used with other types of BPE. For example, the method and system for activating the BPE might be used relative to a wheel which simply selects a single award for one or more players (such as one or more of a fixed amount or progressive jackpot), rather than a first award and a second award, or relative to other elements for displaying or indicating an additional award (such as beyond awards defined by the underlying game itself).

To enhance security at casinos, more and more table games, bonus events and secondary games use electronic wagering systems, such as player input is controls, video display screens and a processor with memory configured to store and receive credit, and debit and credit accrual in credit. The gaming system may operate as an electronic device (table, console, bank of games machines, etc.). Each table and/or each player position may have a value-in-value-out component selected from the group consisting of a currency validator with a currency scanner 20 and currency-advancing motor, a ticket-in-ticket-out reader and printer combination, a magnetic or bar code reader accessible through an input opening, and an electronic wallet near-field communication reader.

The electronic alternative of this technology may be provided by components similar to or identical to a standard EGM, with software and display images in memory that can implement a reproduction or duplication of the operation of a physical device.

Other options are within the scope of the disclosure such as automated highlighting of individual random outcomes on the bonus device, and the like.

It will be understood that the above described arrangements of apparatus and the method there from are merely illustrative of applications of the principles of this disclosure and many other examples and modifications may be made without departing from the spirit and scope of the disclosure as defined in the claims.

What is claimed is:

1. A system for implementing a bonus providing element distinct from play of an underlying table game for indicating at least one award to at least one qualifying player of said underlying table game based upon an occurrence of a generated bonus triggering event in the underlying table game, where the generated bonus triggering event may comprise a number of underlying game event triggers which randomly vary from one play of the underlying table game to another, comprising:

a controller;

at least one input device configured to receive an input regarding events associated with said underlying table game;

at least one memory;

a table of selectable numbers of triggers stored in said at least one memory, said selectable numbers of triggers comprising at least a first number of triggers and a second number of triggers, the second number being different than the first number;

a database of underlying table game events stored in said at least one memory, said underlying table game events comprising events associated with said underlying table game;

at least one display device;

machine-readable code stored in said at least one memory and executable by said controller to implement at least one random number generator; and machine-readable code stored in said at least one memory and executable by said controller to cause said controller to:

generate a bonus triggering event comprising utilizing a first random number generated by said at least one random number generator to select a number of triggers from said table and utilizing one or more second random numbers generated by said at least one random number generator to select, from said database of underlying table game events, an underlying table game event corresponding to each of said number of triggers, wherein relative to the play of at least one underlying table game, said generated bonus triggering event comprises a first number of triggers and wherein relative to the play of at least one other underlying game, said generated bonus triggering event comprises a second number of triggers;

cause said at least one display device to display an indication of said triggers corresponding to said generated bonus triggering event before a conclusion of said underlying game;

utilize said input from said at least one input device to determine if any of said number of triggers of said generated bonus triggering event has occurred in said underlying game and, if so:

activating said bonus providing element; and causing said at least one display device to display a graphical selection of at least one bonus providing element from a set of bonus providing elements for award to at least one player of said underlying game.

2. The system in accordance with claim 1, wherein said first number of triggers is less than said second number of triggers.

3. The system in accordance with claim 2, wherein said second number of triggers is selected less frequently than said first number of triggers.

4. The system in accordance with claim 3, wherein said table of selectable numbers of triggers includes a lower number of occurrences of said second number of triggers than said first number of triggers.

5. The system in accordance with claim 1 wherein said underlying table game comprises a roulette game and wherein said underlying table game events comprise selection of at least one roulette wheel number.

6. The system in accordance with claim 5 wherein when said generated bonus triggering event has a single trigger, said single trigger comprises a single roulette wheel number and when said generated triggering event has two triggers, said two triggers comprise two different roulette wheel numbers.

7. The system in accordance with claim 5 wherein said number of triggers comprises one, two or three triggers, and when said number of triggers comprises one trigger, a single roulette wheel number is selected, when said number of triggers comprises two triggers, two different roulette wheel numbers are selected, and when said number of triggers comprises three triggers, three different roulette wheel numbers are selected.

8. The system in accordance with claim 1, wherein activating said bonus providing element comprises:

a) displaying, via said at least one display device, a first concentric circular wheel comprising a plurality of sectors, each sector identifying a first award;

b) displaying, via said at least one display device, a second concentric circular wheel comprising a plurality of sectors, each sector identifying a single one of said players; and c) displaying, via said at least one display device, a third concentric circular wheel comprising a plurality of sectors, each sector identifying a second award;

and graphically displaying rotation of said first, second and third concentric wheels and a selection of one of said plurality of sectors of said first concentric wheel to identify said first award to each qualifying player, a selection of one of said plurality of sectors of said second concentric wheel to identify said selected one of said players, and a selection of one of said plurality of sectors of said third concentric wheel to identify said second award to be awarded to said selected one of said players when said selected one of said players is one of said qualifying players.

9. A roulette game including a system for real-time random selection of at least one roulette wheel triggering number for each play of the roulette game, where occurrence of the at least one roulette wheel triggering number as an outcome of the play of the roulette game activates a bonus providing element distinct from play of the roulette game for indicating at least one award to at least one qualifying player of the roulette game, comprising:

a roulette table including a roulette wheel displaying a plurality of roulette wheel numbers and configured to select of one of said roulette wheel numbers for each play of said roulette game;

a controller;

at least one input device configured to provide an output to said controller regarding an outcome of each play of said roulette game;

a memory;

at least one display device associated with said roulette table;

a table of selectable numbers of triggers stored in said at least one memory, said selectable numbers of triggers comprising at least a first number of triggers and a second number of triggers, the second number being different than the first number;

a database of roulette wheel numbers;

machine-readable code stored in said at least one memory and executable by said controller to implement at least one random number generator; and machine-readable code stored in said at least one memory and executable by said controller to cause said controller to:

generate a roulette game bonus triggering event comprising utilizing a first random number generated by said at least one random number generator to select a number of triggers from said table and utilizing one or more second random numbers generated by said at least one random number generator to select, from said database, a roulette wheel number corresponding to each of said number of triggers, wherein relative to the play of at least one roulette game, the generated roulette game bonus triggering event comprises a first number of roulette wheel triggering numbers and wherein relative to the play of at least one other roulette game, said generated roulette game bonus triggering event comprises a second number of roulette wheel triggering numbers;

cause said at least one display device to display an indication of said roulette wheel triggering numbers corresponding to said generated roulette game bonus triggering event before a conclusion of said roulette game;

utilize said input to from said at least one input device to determine if any of said roulette wheel triggering numbers corresponding to said generated roulette wheel bonus triggering event has occurred in said roulette game and, if so:

activating said bonus providing element; and causing said at least one display device to display a graphical selection of at least one bonus providing element from a set of bonus providing elements for award to at least one player of said roulette game.

10. The roulette game in accordance with claim 9, wherein said first number of triggers numbers is smaller than said second number of triggers and said odds of selecting said second number of triggers is less than said odds of selecting said first number of triggers numbers.

11. The roulette game in accordance with claim 10, wherein said first number of triggers is selected more frequently than said second number of triggers.

12. The roulette game in accordance with claim 9, wherein activating said bonus providing element comprises:

a) displaying, via said at least one display device, a first concentric circular wheel comprising a plurality of sectors, each sector identifying a first award;

b) displaying, via said at least one display device, a second concentric circular wheel comprising a plurality of sectors, each sector identifying a single one of said players; and c) displaying, via said at least one display device, a third concentric circular wheel comprising a plurality of sectors, each sector identifying a second award;

and graphically displaying rotation of said first, second and third concentric wheels and a selection of one of said plurality of sectors of said first concentric wheel to identify said first award to each qualifying player, a selection of one of said plurality of sectors of said second concentric wheel to identify said selected one of said players, and a selection of one of said plurality of sectors of said third concentric wheel to identify said second award to be awarded to said selected one of said players when said selected one of said players is one of said qualifying players.

* * * * *